US012572941B2

(12) United States Patent
Nascimento et al.

(10) Patent No.: US 12,572,941 B2
(45) Date of Patent: Mar. 10, 2026

(54) MULTI-MODEL SYSTEM FOR ELECTRONIC TRANSACTION AUTHORIZATION AND FRAUD DETECTION

(71) Applicant: ADP, Inc., Roseland, NJ (US)

(72) Inventors: Carlos Nascimento, Porto Alegre (BR); Guilherme Gomes, Porto Alegre (BR); Roberto Coutinho, Porto Alegre (BR); Roberto Silveira, Porto Alegre (BR)

(73) Assignee: ADP, Inc., Roseland, NJ (US)

(*) Notice: Subject to any disclaimer, the term of this patent is extended or adjusted under 35 U.S.C. 154(b) by 0 days.

(21) Appl. No.: 18/669,232

(22) Filed: May 20, 2024

(65) Prior Publication Data

US 2025/0061460 A1 Feb. 20, 2025

Related U.S. Application Data

(63) Continuation of application No. 17/451,045, filed on Oct. 15, 2021, now Pat. No. 11,989,733.

(51) Int. Cl.
*G06Q 20/40* (2012.01)
*G06F 18/20* (2023.01)
(Continued)

(52) U.S. Cl.
CPC ....... *G06Q 20/4016* (2013.01); *G06F 18/285* (2023.01); *G06N 3/08* (2013.01); (Continued)

(58) Field of Classification Search
CPC ............. G06Q 20/4016; G06V 30/413; G06V 30/416; G06V 30/1473
See application file for complete search history.

(56) References Cited

U.S. PATENT DOCUMENTS 7,398,925 B2 7/2008 Tidwell et al.
10,235,660 B1 3/2019 Bueche et al.
(Continued)

FOREIGN PATENT DOCUMENTS

WO WO-2020/136778 A1 7/2020

OTHER PUBLICATIONS

He et al, "Deep Residual Learning for Image Recognition", Microsoft Research, arXiv:1512.03385v1, Dec. 10, 2015, pp. 1-12.
(Continued)

*Primary Examiner* — Scott C Anderson
(74) *Attorney, Agent, or Firm* — Foley & Lardner LLP

(57) ABSTRACT

A method receives an electronic image and uses the image as an input to a neural network. Based on a determination that the image represents a document, the method uses the image as an input to another neural network to identify a portion of the document containing an identifier. The method extracts the identifier by performing character recognition on the identified portion and determines whether the identifier is valid by using a validation API to determine whether the identifier is associated with a valid account at an institution. Based on a determination that the identifier is associated with a valid account, the method authorizes a transaction associated with the identifier. Based on a determination that the identifier is not associated with a valid account, the method denies the transaction. The first neural network classifies the electronic image into one of multiple valid document types and an invalid document type.

20 Claims, 14 Drawing Sheets

(51) Int. Cl.

| | |
|---|---|
| ***G06N 3/08*** | (2023.01) |
| ***G06V 30/146*** | (2022.01) |
| ***G06V 30/413*** | (2022.01) |
| ***G06V 30/416*** | (2022.01) |

(52) U.S. Cl.

CPC ........ *G06V 30/1473* (2022.01); *G06V 30/413* (2022.01); *G06V 30/416* (2022.01)

(56) References Cited

U.S. PATENT DOCUMENTS

| | | | | |
|---|---|---|---|---|
| 2004/0220839 | A1* | 11/2004 | Bonissone | G06Q 10/10 705/4 |
| 2009/0171827 | A1 | 7/2009 | Callahan et al. | |
| 2009/0319505 | A1* | 12/2009 | Li | G06F 40/279 707/999.005 |
| 2011/0134248 | A1* | 6/2011 | Heit | H04N 1/00286 348/161 |
| 2013/0062406 | A1 | 3/2013 | Gustin et al. | |
| 2014/0279516 | A1* | 9/2014 | Rellas | G07D 7/206 705/318 |
| 2017/0365026 | A1 | 12/2017 | Yadav-Ranjan | |
| 2018/0108101 | A1 | 4/2018 | Rodriguez et al. | |
| 2018/0324595 | A1 | 11/2018 | Shima | |
| 2020/0005258 | A1 | 1/2020 | Miller et al. | |
| 2020/0211305 | A1 | 7/2020 | Bender et al. | |
| 2020/0234110 | A1* | 7/2020 | Singh | G06N 3/0985 |
| 2020/0311736 | A1* | 10/2020 | Song | G06Q 20/383 |
| 2020/0364485 | A1 | 11/2020 | Wu et al. | |
| 2020/0394790 | A1* | 12/2020 | Kaethner | A61B 6/481 |
| 2020/0401506 | A1 | 12/2020 | Sathianarayanan et al. | |
| 2021/0058233 | A1 | 2/2021 | Lee et al. | |
| 2021/0124919 | A1 | 4/2021 | Balakrishnan et al. | |
| 2021/0150338 | A1 | 5/2021 | Semenov | |
| 2021/0182550 | A1 | 6/2021 | Semenov | |
| 2021/0182803 | A1* | 6/2021 | Mintz | G06N 20/00 |

OTHER PUBLICATIONS

He et al., "Mask R-CNN", Facebook AI Research, arXiv preprint arXiv:1703.06870, Mar. 20, 2017, pp. 1-9.

He et al., "Delving Deep into Rectifiers: Surpassing Human-Level Performance on ImageNet Classification," Microsoft Research, arXiv preprint arXiv:1502.01852, Feb. 6, 2015, pp. 1-11.

International Search Report and Written Opinion issued in corresponding International Application No. PCT/US2022/078122, dated Jan. 10, 2023 (8 pages).

Mayer et al., "A Large Dataset to Train Convolutional Networks for Disparity, Optical Flow, and Scene Flow Estimation," arXiv preprint arXiv:1512.02134, Dec. 7, 2015, pp. 1-14.

Murphy, "Machine Learning: a Probabilistic Perspective", The MIT Press, May 2012, Cambridge, Massachusetts, 27 pages.

Nair et al., "Rectified linear units improve restricted Boltzmann machines," ICML, 2010, pp. 807-814.

Notice of Allowance issued in corresponding US Application No. 17,451,045, dated Jan. 18, 2024 (10 pages).

US Office Action issued in corresponding U.S. Appl. No. 17/451,045, dated Sep. 15, 2023 (27 pages).

Agrawal Prateek et al: "Automated bank 1-15 cheque verification using image processing and deep learning methods", Multimedia Tools and Applications, vol. 80, No. 4, Oct. 6, 2020 (Oct. 6, 2020), pp. 5319-5350, XP037353605, ISSN: 1380-7501, DOI: 10.1007/S11042-02009818-1.

Extended European Search Report issued in corresponding EP Patent Application No. 22882047.8, dated Aug. 1, 2025 (11 pages).

* cited by examiner

```
{
   "isValid":true
}
```

FIG. 6A

```
{
   "isValid":true,
   "RoutingNumber": "1234567",
   "BankAccount: "987654321"
}
```

FIG. 6B

```
{
   "isValid":true,
   "RoutingNumber": "1234567",
   "BankAccount: "987654321",
   "GiactVerification": false
}
```

BEGIN

910 — Receive sample dataset with expected output

920 — Select subset of sample dataset as a training dataset

930 — Forward-propagate training dataset through neural network

940 — Calculate loss function using actual and expected outputs

950 — Back-propagate loss function through neural network

960 — Update weights and bias in neural network

END

MULTI-MODEL SYSTEM FOR ELECTRONIC TRANSACTION AUTHORIZATION AND FRAUD DETECTION

BACKGROUND

1. Technical Field

The present disclosure relates to authorization of online transactions and fraud detection.

2. Introduction

Fraud detection in online systems is tremendously important in many different areas of application, including financial transactions and governmental functions. Online services require solutions to identify fraudulent electronic transactions and take quick action to prevent them. Managing fraud is essential for business success. On average, fraud costs businesses 1.8% of revenue, but fraud also impacts brand and customer loyalty. Legitimate consumers who are impacted by fraud often blame the online seller or system, and are less likely to register/buy from their services again. Accordingly, there is a need for online systems that can automatically identify fraudulent actions in real-time and flag them.

SUMMARY

According to an embodiment, a method includes receiving an electronic image from an image storage, determining whether the electronic image represents a document by using the electronic image as an input to a first neural network, and based on a determination that the electronic image represents a document, using the electronic image as an input to a second neural network to identify a portion of the document containing an identifier. The method further includes extracting the identifier by performing character recognition on the identified portion of the document containing the identifier, and determining whether the identifier is valid by using a validation application programming interface (API) to determine whether the identifier is associated with a valid account at an institution. Based on a determination that the identifier is associated with a valid account, the method authorizes a transaction associated with the identifier. Based on a determination that the identifier is not associated with a valid account, the method denies the transaction associated with the identifier. Determining whether the electronic image represents a document includes using the first neural network to classify the electronic image into one of multiple document types, including multiple valid document types and an invalid document type.

According to another embodiment, a system includes an image storage that provides an electronic image, a classifier that determines whether the electronic image represents a document by using the electronic image as an input to a first neural network, and a segmenter that, based on a determination by the classifier that the electronic image represents a document, uses the electronic image as an input to a second neural network to identify a portion of the document containing an identifier. The system further includes an extractor that extracts the identifier by performing character recognition on the identified portion of the document containing the identifier, and a validator that determines whether the identifier is valid by using a validation application programming interface (API) to determine whether the identifier is associated with a valid account at an institution. Based on a determination that the identifier is associated with a valid account, the validator authorizes a transaction associated with the identifier. Based on a determination that the identifier is not associated with a valid account, the validator denies the transaction associated with the identifier. The classifier determines whether the electronic image represents a document by using the first neural network to classify the electronic image into one of multiple document types, including multiple valid document types and an invalid document type.

According to still another embodiment, a method includes using a first plurality of electronic images to train a first neural network to identify documents, and using a second plurality of electronic images to train a second neural network to identify regions of documents that include identifiers. The method further includes accessing, at one or more computing devices, an electronic image, using the first neural network to determine that the electronic image represents a document, and using the second neural network to identify a portion of the electronic image that includes an identifier. The method further includes extracting the identifier by performing character recognition on the identified portion of the electronic image, using an application programming interface (API) to determine that the identifier is associated with a valid account at an institution, and authorizing a transaction associated with the identifier. The first neural network classifies the electronic image into one of multiple document types, including a plurality of valid document types and an invalid document type.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The foregoing and other features and advantages will be apparent from the following, more particular, description of various embodiments, as illustrated in the accompanying drawings, FIG. 1A shows an example of an image classified as an invalid document type. FIG. 1B shows an example of an image classified as a valid document type.

FIG. 6A through 6C show examples of a data structure that in some embodiments is populated by different components of the system in FIG. 3. FIG. 6A shows the data structure after the classifier has determined that the image is a valid document. FIG. 6B shows the data structure after the segmenter has extracted the identifier. FIG. 6C shows the data structure after the validator has found that the identifier is not associated with a valid account at an institution.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

In online transaction systems, registered users may be required to upload documentation. The documentation may be used to authenticate the user's identity and access to the electronic transaction system, in order to authorize the electronic transaction. For example, for some electronic transactions, a user may be required to upload an image of a voided check, or a copy of a bank statement as proof of account. As another example, for a visa application a citizen of one country may be required to upload an image of their passport or birth certificate, as proof of citizenship or residency. The identifying information from these documents may be used to authenticate the user and authorize the transaction.

Figure 1A:
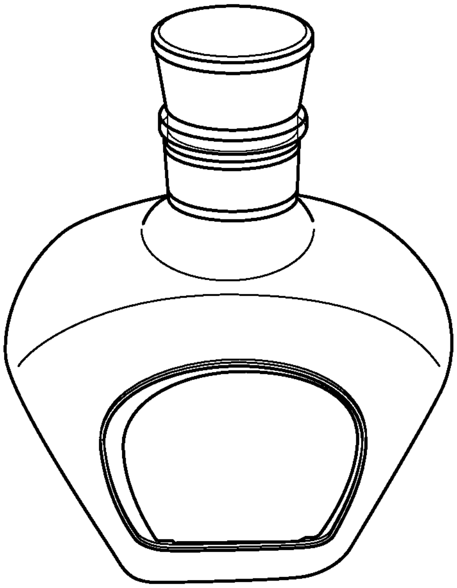
FIGS. 1A and 1B show examples of images received by the classifier.

During this process, fraudsters may attempt to circumvent the system and execute unauthorized transactions. For example, a fraudster may upload random images that do not represent the required document, in order to register a false account. FIG. 1A shows an example of an image uploaded by a fraudster in lieu of a bank proof. Detecting this fraud activity presently requires substantial time. As such, the fraudster has a window of opportunity to commit crime or engage in unauthorized activity before their account is invalidated or deactivated.

Figure 1B:
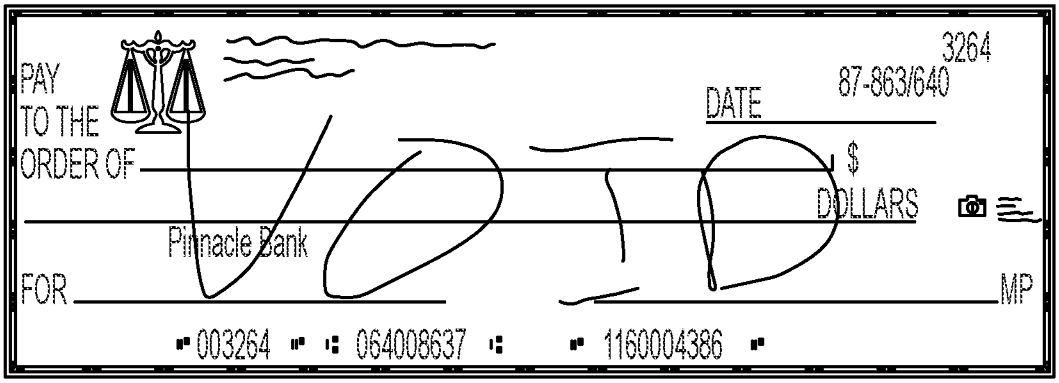

Another concern is a more sophisticated exploit where a fraudster uploads a nominally valid image of document, but with fake or doctored identifiers. This requires a more detailed examination for validation of the document and identifiers. For example, FIG. 1B shows an example of a seemingly valid image of a voided check, of which the routing number and the bank number may be valid, or may have been manipulated or corrupted.

Computer vision, a sub-area of Artificial Intelligence, can be utilized to identify if the uploaded electronic document is valid, and once this criterion is validated, automatically extract and validate the identifiers. This process can be performed in real-time to flag and freeze suspicious electronic transactions while allowing legitimate users to proceed.

Accordingly, some embodiments use a multi-modal approach to provide a fully automated and real-time solution to the problem where a fraudster emulates a required electronic document (e.g., a voided check) with a false identifier (e.g., routing number and account number). Specifically, the multi-modal solution is to provide a complete pipeline flow combining machine learning and artificial intelligence approaches with text extraction and software engineering to classify the uploaded electronic document, extract the identifiers, validate the identifiers, and make an authorization decision (deny/allow) for the requested electronic transaction. This software architecture may receive (e.g., through an application programming interface API) an electronic image as input, process the electronic image through the pipeline, and output the authorization decision. The transaction may proceed or not based on the authorization decision. For example, access to an account or a transaction may be allowed or denied based on the authorization decision.

The electronic image may be classified using an Artificial Neural Network for document classification. Document classification is the act of labeling—or tagging—documents using categories, depending on their content. Automated document classification within the field of computer science is used to easily sort and manage texts, images, or videos. Both types of document classification have their advantages and disadvantages.

This document classification step may determine if the electronic image properly represents a required document. If not, then the pipeline my freeze the user's account (e.g., tags them as inactive) and/or either deny or place the requested transaction on hold for manual review and validation by a human agent. If the electronic image does represent a valid document, then the system proceeds to the next step of the pipeline.

Another step of the pipeline is to segment the electronic image, using another Artificial Neural Network to recognize the area (bounding box area) of the image where the relevant identifier is expected to be located. This document segmentation extracts the identifier from the image of the document. The task of image segmentation is to train a neural network to output a pixel-wise mask/classification of the image. Segmentation is an important stage of the image recognition system because it extracts objects of interest, for further processing such as description or recognition. Segmentation techniques are used to isolate the desired object from the image in order to perform an analysis of the object. In this use case, the neural network is trained to recognize specific identifiers from certain types of documents, such as the routing and account number from the voided checks. A model may be trained using checks having routing and account numbers in specific areas so that the model can recognize that information in an uploaded document. The training may also account for the format of the number, e.g., length, groups of digits and characters, etc.

Another step of the pipeline is to validate the identifier. This can be done using an external API, or an internal sub-system. The identifier may be found to be invalid for multiple reasons, including fraud, canceled or canceled account, etc. If the validation fails, the pipeline may freeze the user's account (e.g., tags them as inactive) and/or either denies or puts the requested transaction on hold for manual review and validation by a human agent. If the identifier is found to be valid, then the requested transaction is authorized to proceed.

The neural network of some embodiments is a multi-layer machine-trained network (e.g., a feed-forward neural network). Neural networks, also referred to as machine-trained networks, will be herein described. One class of machine-trained networks are deep neural networks with multiple layers of nodes. Different types of such networks include feed-forward networks, convolutional networks, recurrent networks, regulatory feedback networks, radial basis function networks, long-short term memory (LSTM) networks, and Neural Turing Machines (NTM). Multi-layer networks are trained to execute a specific purpose, including face recognition or other image analysis, voice recognition or other audio analysis, large-scale data analysis (e.g., for climate data), etc. In some embodiments, such a multi-layer network is designed to execute on a mobile device (e.g., a smartphone or tablet), an IoT device, a web browser window, etc.

A typical neural network operates in layers, each layer having multiple nodes. In convolutional neural networks (a type of feed-forward network), a majority of the layers include computation nodes with a (typically) nonlinear activation function, applied to the dot product of the input values (either the initial inputs based on the input data for the first layer, or outputs of the previous layer for subsequent layers) and predetermined (i.e., trained) weight values, along with bias (addition) and scale (multiplication) terms, which may also be predetermined based on training. Other types of neural network computation nodes and/or layers do not use dot products, such as pooling layers that are used to reduce the dimensions of the data for computational efficiency and speed.

For convolutional neural networks that are often used to process electronic image and/or video data, the input activation values for each layer (or at least each convolutional layer) are conceptually represented as a three-dimensional array. This three-dimensional array is structured as numerous two-dimensional grids. For instance, the initial input for an image is a set of three two-dimensional pixel grids (e.g., a 1280×720 RGB image will have three 1280×720 input grids, one for each of the red, green, and blue channels). The number of input grids for each subsequent layer after the input layer is determined by the number of subsets of weights, called filters, used in the previous layer (assuming standard convolutional layers). The size of the grids for the subsequent layer depends on the number of computation nodes in the previous layer, which is based on the size of the filters, and how those filters are convolved over the previous layer input activations. For a typical convolutional layer, each filter is a small kernel of weights (often 3×3 or 5×5) with a depth equal to the number of grids of the layer's input activations. The dot product for each computation node of the layer multiplies the weights of a filter by a subset of the coordinates of the input activation values. For example, the input activations for a 3×3×Z filter are the activation values located at the same 3×3 square of all Z input activation grids for a layer.

Figure 2:
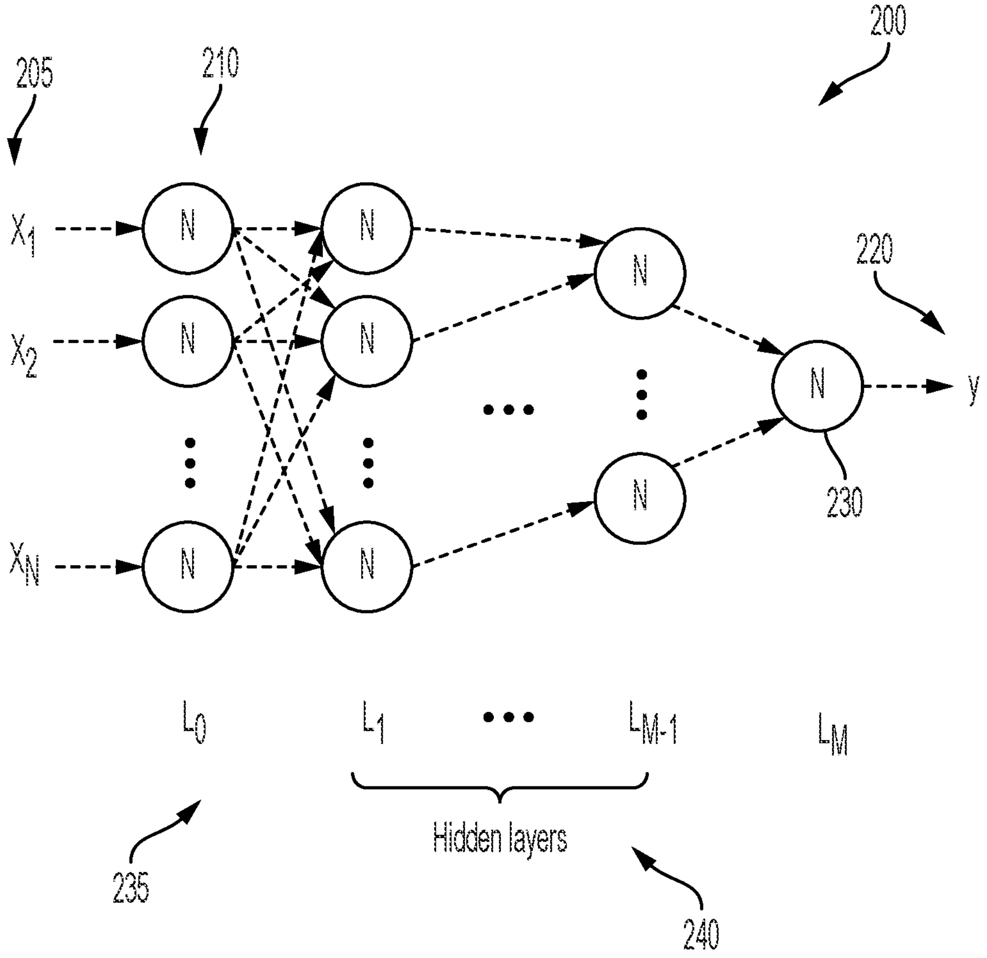
FIG. 2 conceptually illustrates a neural network used by the classifier or the segmenter in some embodiments.

FIG. 2 illustrates an example of a multi-layer machine-trained network of some embodiments. This figure illustrates a feed-forward neural network 200 that receives an input vector 205 (denoted $x_1, x_2, \ldots x_N$) at multiple input nodes 210 and computes an output 220 (denoted by y) at an output node 230. The neural network 200 has multiple layers $L_0, L_1, L_2 \ldots L_M$ 235 of processing nodes (also called neurons, each denoted by N). In all but the first layer (input, $L_0$) and last layer (output, $L_M$), each node receives two or more outputs of nodes from earlier processing node layers and provides its output to one or more nodes in subsequent layers. These layers are also referred to as the hidden layers 240. Though only a few nodes are shown in FIG. 2 per layer, a typical neural network may include a large number of nodes per layer (e.g., several hundred or several thousand nodes) and significantly more layers than shown (e.g., several dozen layers). The output node 230 in the last layer computes the output 220 of the neural network 200.

In this example, the neural network 200 only has one output node 230 that provides a single output 220. Other neural networks of other embodiments have multiple output nodes in the output layer $L_M$ that provide more than one output value. In different embodiments, the output 220 of the network is a scalar in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

Portions of the illustrated neural network 200 are fully-connected in which each node in a particular layer receives as inputs all of the outputs from the previous layer. For example, all the outputs of layer $L_0$ are shown to be an input to every node in layer $L_1$. The neural networks of some embodiments are convolutional feed-forward neural networks, where the intermediate layers (referred to as "hidden" layers) may include other types of layers than fully-connected layers, including convolutional layers, pooling layers, and normalization layers.

The convolutional layers of some embodiments use a small kernel (e.g., 3×3×3) to process each tile of pixels in an image with the same set of parameters. The kernels (also referred to as filters) are three-dimensional, and multiple kernels are used to process each group of input values in in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

Each node computes a dot product of a vector of weight coefficients and a vector of output values of prior nodes (or the inputs, if the node is in the input layer), plus an offset. In other words, a hidden or output node computes a weighted sum of its inputs (which are outputs of the previous layer of nodes) plus an offset (also referred to as a bias). Each node then computes an output value using a function, with the weighted sum as the input to that function. This function is commonly referred to as the activation function, and the outputs of the node (which are then used as inputs to the next layer of nodes) are referred to as activations.

Consider a neural network with one or more hidden layers 240 (i.e., layers that are not the input layer or the output layer). The index variable l can be any of the hidden layers of the network (i.e., $l \in \{1, \ldots, M-1\}$, with l=0 representing the input layer and l=M representing the output layer).

The output $y_{l+1}$ of node in hidden layer l+1 can be expressed as:

$$y_{l+1} = f((w_{l+1} \cdot y_l) * c + b_{l+1}) \tag{1}$$

This equation describes a function, whose input is the dot product of a vector of weight values $w_{l+1}$ and a vector of outputs $y_l$ from layer l, which is then multiplied by a constant value c, and offset by a bias value $b_{l+1}$. The constant value c is a value to which all the weight values are normalized. In some embodiments, the constant value c is 1. The symbol * is an element-wise product, while the symbol • is the dot product. The weight coefficients and bias are parameters that are adjusted during the network's training in order to configure the network to solve a particular problem (e.g., object or face recognition in images, voice analysis in audio, depth analysis in images, etc.).

In equation (1), the function $f$ is the activation function for the node. Examples of such activation functions include a sigmoid function ($f(x)=1/(1+e^{-x})$), a tanh function, or a ReLU (rectified linear unit) function ($f(x)=\max(0,x)$). See Nair, Vinod and Hinton, Geoffrey E., "Rectified linear units improve restricted Boltzmann machines," ICML, pp. 807-814, 2010, incorporated herein by reference in its entirety. In addition, the "leaky" ReLU function ($f(x)=\max(0.01*x, x)$) has also been proposed, which replaces the flat section (i.e., x<0) of the ReLU function with a section that has a slight slope, usually 0.01, though the actual slope is trainable in some embodiments. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015, incorporated herein by reference in its entirety. In some embodiments, the activation functions can be other types of functions, including gaussian functions and periodic functions.

Before a multi-layer network can be used to solve a particular problem, the network is put through a supervised training process that adjusts the network's configurable parameters (e.g., the weight coefficients, and additionally in some cases the bias factor). The training process iteratively selects different input value sets with known output value sets. For each selected input value set, the training process typically (1) forward propagates the input value set through the network's nodes to produce a computed output value set and then (2) back-propagates a gradient (rate of change) of a loss function (output error) that quantifies the difference between the input set's known output value set and the input set's computed output value set, in order to adjust the network's configurable parameters (e.g., the weight values).

In some embodiments, training the neural network involves defining a loss function (also called a cost function) for the network that measures the error (i.e., loss) of the actual output of the network for a particular input compared to a pre-defined expected (or ground truth) output for that particular input. During one training iteration (also referred to as a training epoch), a training dataset is first forward-propagated through the network nodes to compute the actual network output for each input in the data set. Then, the loss function is back-propagated through the network to adjust the weight values in order to minimize the error (e.g., using first-order partial derivatives of the loss function with respect to the weights and biases, referred to as the gradients of the loss function). The accuracy of these trained values is then tested using a validation dataset (which is distinct from the training dataset) that is forward propagated through the modified network, to see how well the training performed. If the trained network does not perform well (e.g., have error less than a predetermined threshold), then the network is trained again using the training dataset. This cyclical optimization method for minimizing the output loss function, iteratively repeated over multiple epochs, is referred to as stochastic gradient descent (SGD).

In some embodiments the neural network is a deep aggregation network, which is a stateless network that uses spatial residual connections to propagate information across different spatial feature scales. Information from different feature scales can branch-off and re-merge into the network in sophisticated patterns, so that computational capacity is better balanced across different feature scales. Also, the network can learn an aggregation function to merge (or bypass) the information instead of using a non-learnable (or sometimes a shallow learnable) operation found in current networks.

Deep aggregation networks include aggregation nodes, which in some embodiments are groups of trainable layers that combine information from different feature maps and pass it forward through the network, skipping over backbone nodes. Aggregation node designs include, but are not limited to, channel-wise concatenation followed by convolution (e.g., DispNet), and element-wise addition followed by convolution (e.g., ResNet). See Mayer, Nikolaus, Ilg, Eddy, Häusser, Philip, Fischer, Philipp, Cremers, Daniel, Dosovitskiy, Alexey, and Brox, Thomas, "A Large Dataset to Train Convolutional Networks for Disparity, Optical Flow, and Scene Flow Estimation," arXiv preprint arXiv: 1512.02134, 2015, incorporated herein by reference in its entirety. See He, Kaiming, Zhang, Xiangyu, Ren, Shaoqing, and Sun, Jian, "Deep Residual Learning for Image Recognition," arXiv preprint arXiv: 1512.03385, 2015, incorporated herein by reference in its entirety.

Figure 3:
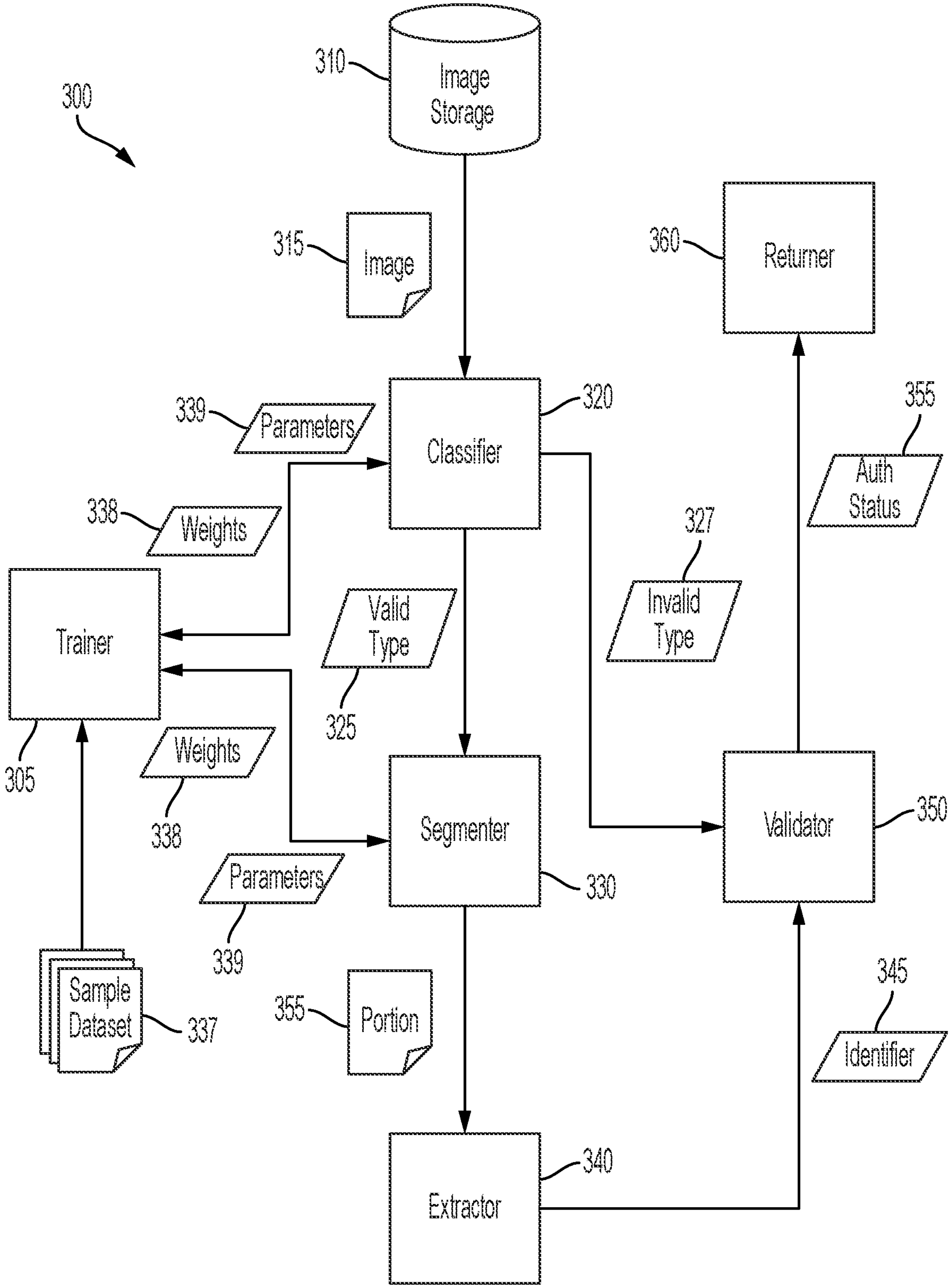
FIG. 3 conceptually illustrates a system of some embodiments.

FIG. 3 conceptually illustrates a system 300 of some embodiments. This system includes a number of components that each may be implemented on a server or on an end-user device. In some cases, a subset of the components may execute on a user device (e.g., a mobile application on a cell phone, a webpage running within a web browser, a local application executing on a personal computer, etc.) and another subset of the components may execute on a server (a physical machine, virtual machine, or container, etc., which may be located at a datacenter, a cloud computing provider, a local area network, etc.).

These components include, but are not limited to, a trainer 305, an image storage 310, a classifier 320, a segmenter 330, an extractor 340, a validator 350, and a returner 360. These components of the system 300 illustrated in FIG. 3 may be implemented in some embodiments as software programs or modules. In other embodiments, some or all of the components may be implemented in hardware, including in one or more signal processing and/or application specific integrated circuits. While the components are shown as separate components, one of ordinary skill in the art will recognize that two or more components may be integrated into a single component. Also, while many of the components' functions are described as being performed by one component, one of ordinary skill in the art will realize that the functions may be split among two or more separate components.

The image storage 310 stores electronic images that are provided, for example, from users or data services. These images may be received directly, such as through a file upload or camera on mobile phone or computer, or by using an application programming interface (API). After receiving an image 315, the image storage 310 provides the image 315 to the other components of the system. Supported image file formats may include but are not limited to image file formats (PNG, JPEG, GIF, TIFF, etc.), Portable Document Format (PDF), proprietary or open document formats, and video files.

The classifier 320 receives the image 315 from the image storage 310, as indicated by the arrow from the image storage 310 to the classifier 320. The classifier 320 classifies the image 315 to determine whether it represents a type of document or does not represent a document at all. In some embodiments, the classifier 320 makes this determination by using the image 315 as an input to a neural network, such as a multi-layer machine-trained network (e.g., a feed-forward neural network), described with reference to FIG. 36. For example, some embodiments use a Residual Network (ResNet) deep aggregation network architecture, whose core idea is introducing a shortcut connection that skips one or more layers. This is a very computationally efficient architecture, requiring only a few hundred milliseconds for inference. The ResNet architecture has a number of possible outputs, corresponding to different output classes which correspond to different valid document types, as well as at least one output class corresponding to an invalid document type. The invalid document type(s) may be other documents which are not accepted by the system, or may not be images of documents at all. Each of the outputs has a value from zero to one, indicating the probability that the input matches that particular class.

FIGS. 1A and 1B show examples of images received as inputs by the classifier. FIG. 1A shows an example of an image classified as an invalid document type, since the image is actually of a liquor bottle and not of any document at all. In this case, the image in FIG. 1A was uploaded by a fraudster when prompted to provide proof of their bank account. FIG. 1B shows an example of an image classified as a valid document type, which in this case is a voided check, used to authorize a financial transaction. However, even though the image in FIG. 1B appears to be a valid document type, the actual financial identifiers may be fraudulent and need to be validated.

The invalid document type could also be another document. As an example, to process a visa, the valid document types may be passports and birth certificates, which prove citizenship, and an invalid document type may be a driver's license, which does not prove citizenship. Regardless of what the image actually represents, once an image has been classified as an invalid document type, then further processing on that image is no longer necessary. The valid document types for a transaction may be associated with the respective transactions, for example, in a database or memory. The valid documents types for a requested transaction are retrieved and may be used in the classification process. The identifiers and other information regarding the valid document type may also be associated with the valid document.

In embodiments where the classifier 320 uses a neural network, the classification can be either binary (either a valid document or an invalid document), or can provide additional classification of the valid document types (e.g., a bank statement and a voided check in the financial transaction example, or a passport and a birth certificate in the visa application example). However, in some embodiments there is no need to provide types for invalid documents. Therefore, the liquor bottle in FIG. 1B and a driver's license (in the visa application example) would both be classified using the invalid document type. In other embodiments, the classifier 320 does classify non-document images (like the liquor bottle in FIG. 1B) as a separate invalid type than actual documents which are not usable for authentication (like a driver's license, when applying for a visa). By using multiple invalid document types, the system 300 could be easily modified to allow formerly invalid documents to be treated as valid documents, and vice versa, without any change to the classifier 320.

If the classifier 320 determines that the image 315 does represent a valid document, then the valid type 325 of that document is provided to the segmenter 330, as indicated by the arrow from the classifier 320 to the segmenter 330. If the classifier 320 determines that the image 315 does not represent a valid document, then the invalid type 327 is provided to the validator 350, as indicated by the arrow from the classifier 320 to the validator 350. The operations of the classifier 320 are described in further detail with reference to the process 800 in FIG. 8.

The segmenter 330 receives the valid type 325 from the classifier 320. The segmenter 330 also receives the image 315, either from the classifier 320 or directly from the image storage 310. The segmenter 330 determines what portion of the document represented by the image 315 is expected to include a desired identifier. In some embodiments, the segmenter 330 identifies this portion by using the image 315 as an input to a neural network, such as a multi-layer machine-trained network (e.g., a feed-forward neural network), described with reference to FIG. 2. In some embodiments, the segmenter 330 employs multiple neural networks, and selects the most appropriate neural network 200 based on the valid type 325.

Different neural networks may be trained for different types, which may improve accuracy and computational efficiency. For example, some embodiments use a Mask R-CNN architecture, which outputs bounding box coordinates of the detected object (e.g., the identifier) in the image 315. See He, Kaiming, Gkioxari, Georgia, Dollár, Piotr, Girshick, Ross, "Mask R-CNN," arXiv preprint arXiv: 1703.06870, 2017, incorporated herein by reference in its entirety. Since the Mask R-CNN architecture is relatively slow compared to simpler classification architectures (e.g., several seconds for inference on current CPU hardware), multiple implementations of the architecture can be used in some embodiments to optimize for different document types, and selected based on the output from the classifier. The bounding box coordinates are used to define a segmentation mask for the image 315 that crops the image 315 to just the portion 335 containing the identifier.

The segmenter 330 applies the segmentation mask output of the neural network to the original image 315, and outputs the resulting cropped portion 335 to the extractor 340, as indicated by the arrow from the segmenter 330 to the extractor 340. Alternatively, the segmenter 330 outputs the coordinates of the bounding box for the detected identifier, or the equivalent segmentation mask, to the extractor, which the extractor 340 then uses to crop the image 315. The operations of the segmenter 330 are described in further detail with reference to the process 1100 in FIG. 11. In some embodiments, the extractor 340 is a component of the segmenter 330. In other embodiments, the extractor 340 is an external character recognition API, which is invoked by a call from the segmenter 330 using the portion 335 as an input argument to the API call.

Figure 4:
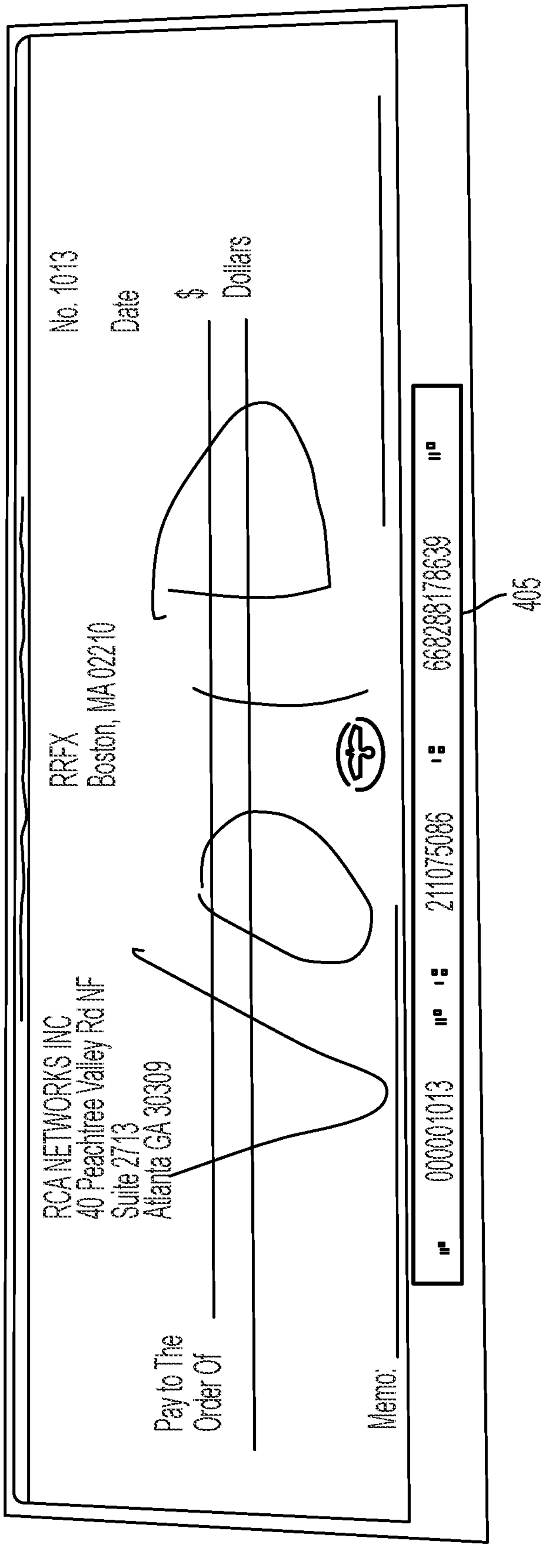
FIG. 4 shows an example of a portion of a valid document identified by the segmenter as containing an identifier.

FIG. 4 shows an example of a portion 335 of a valid document 400 identified by the segmenter 330 as containing an identifier. This electronic image was obtained by the user uploading an image of the document. In this example, the valid document is a voided check, used to authorize a financial transaction. The valid type 325 of this document, as determined by the classifier 320, is type "check", and therefore the segmenter 330 has used segmented the image 315 to identify a bank routing number, a check number, and a bank account number, here outlined with a border to indicate the bounding box 405. Note that the bounding box 405 correctly points to the account number and routing number, indicating that the neural network is properly trained to recognize the identifier for this particular class of document. The portion 335 containing the identifier is the portion of the image 315 inside the bounding box 405.

Figure 5:
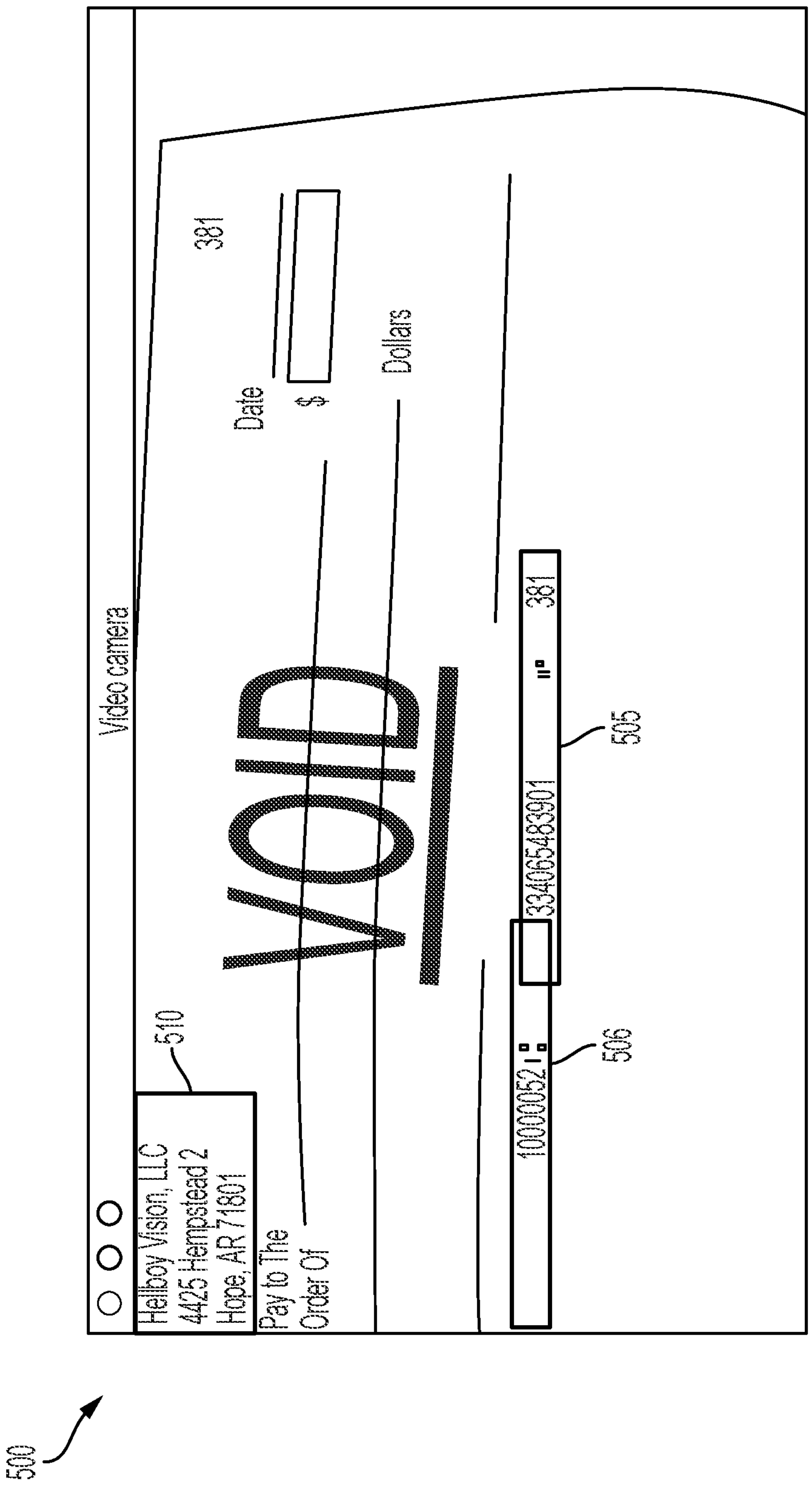
FIG. 5 shows an example of a portion of a valid document identified by the segmenter as containing a financial identifier, and another portion identified by the segmenter as containing a user identifier.

The segmenter 330 can also be trained to recognize and identify multiple types of different identifiers, even within the same document. FIG. 5 shows another example of a valid document 500 with two portions identified by the segmenter 330 as containing identifiers. In this case, the electronic image was obtained by the user holding the document up to a webcam on their computer. Specifically, the segmenter 330 identified portions 505, 506 containing financial identifiers (in this example, a bank routing number, a check number, and a bank account number), and another portion 510 containing a user identifier (here, the name of the account holder and their address).

In embodiments where the classifier 320 and/or the segmenter 330 utilize a neural net, the system 300 also includes a trainer 305 which trains the neural net(s) to perform their classification and/or segmentation functions. The trainer receives a sample dataset 337, which can be divided into training and validation datasets, which are used to determine the weights 338 and other parameters 339 for the neural network. The training process involves a cycle of optimization and feedback of the weights 338 and parameters 339 between the neural network and the trainer 305, as indicated by the double-sided arrows between the trainer 305 and the classifier 320 and segmenter 330. The operations of the trainer 305 are described in further detail with reference to the processes 900 and 1000 in FIG. 9 and FIG. 10, respectively.

The extractor 340 receives the portion 335 (or the bounding box coordinates, as discussed with reference to the segmenter 330) from the segmenter 330. The extractor 340 also receives the image 315, either from the segmenter 330 or directly from the image storage 310. The extractor 340 then extracts the identifier 345 from the portion 335. For example, in some embodiments the extractor 340 uses optical character recognition (OCR) to read the numerals and/or characters of the identifier from the portion 335. After extracting the identifier 345 from the portion 335, the extractor 340 provides the identifier 345 to the validator 350.

For example, the identifier 345 may include financial identifiers, such as a bank routing number and a bank account number, which are necessary to authorize a financial transaction (such as withdrawal of money from a financial account at a bank or other financial institution). The bank/institution name and mailing address could also be part of the extracted identifier.

In some cases, identifiers are printed using specialized fonts, which include control characters (e.g., transit, on-us, amount, dash, etc.). These fonts may be recognized by the extractor 340 in some embodiments (or alternatively, by the segmenter 330 in other embodiments), to facilitate extraction of the identifiers. As an example, most voided checks have the bank routing number and the bank account number printed in specialized financial fonts with control characters acting as delimiters between fields, as seen in the examples of FIG. 1A, FIG. 4, and FIG. 5.

In addition to above noted identifiers, the identifier 345 could also include user identifiers, e.g. additional authentication information about the user (e.g., a person, a business, or other legal entity) who owns the account. These user identifiers include but are not limited to the user's legal name, login username, mailing address, phone number, and/or email address. As another example, the identifier 345 could be a legal name and a place of birth, which are necessary to determine citizenship status to approve a visa application. The passport number could also be part of the extracted identifier 345.

Note that more sophisticated fraudsters could provide valid-seeming documentation such as the check in FIG. 1A, but with counterfeit or doctored identifiers (e.g., a fake bank account number). Therefore, the validator 350 also verifies the extracted identifier 345 as a final check before authorizing the transaction.

In cases where the classifier 320 classified the image 315 as a valid document type, the validator 350 receives the extracted identifier 345 from the extractor 340. In cases where the classifier 320 classified the image 315 as an invalid type 327, the validator 350 receives the invalid type 327 from the classifier 320. The validator 350 then returns an authorization status to the returner 360. The validator makes the determination in some embodiments using a call to an application programming interface (API) whose input is the identifier 345 or the invalid type 327. The operations of the validator 350 are described in further detail with reference to the process 1200 in FIG. 12.

For example, for a financial transaction, the identifier 345 includes financial identifiers like bank routing number and bank account number. These numbers are then used as input to a validation API (e.g., the EPIC® platform by Giact Systems LLC) that validates whether the bank routing number corresponds to a real financial institution, and whether the account number corresponds to a valid and active account at that financial institution. Additional information such as the user identifiers may also be used as inputs to the API.

The returner 360 receives the authorization status from the validator 350. The returner then provides that status to the entity—a user, an institution, etc.—that initiated the process by providing the image 315 to the image storage 310. In some embodiments, the returner 360 provides the authorization status as an output from an API call, which was made with the image 315 as an input argument.

In some embodiments, such as embodiments where the system 300 receives the image 315 and returns the authorization decision as part of an authorization API call, the state of the system 300 during the pipeline of operations performed by the various components is tracked and stored, for example in a data structure that can also be provided along with the authorization status. FIG. 6A-7C show examples of a data structure 600 that in some embodiments is populated by different components of the system in FIG. 3.

FIG. 6A shows the data structure 600 after the classifier 320 has determined that the image 315 represents a valid document. The classifier 320 inserts a validation flag, "is Valid" to the data structure 600 with the value "true." Other components of the system 300, such as the segmenter 330 and the validator 350, are able to access the data structure 600 and read this flag. For example, in some embodiments the segmenter 330 checks this value and requires it to be true before commencing a segmentation operation.

FIG. 6B shows the data structure 600 after the segmenter 330 has extracted the identifier 345. The segmenter populates the data structure 600 with the actual extracted text of the identifier, which in this case is a bank routing number (labeled "RoutingNumber") and a bank account number (labeled "AccountNumber"). In some embodiments, the validator 350 receives the identifier 345 by accessing the data structure 600 and reading the values stored therein. The validator 350 may also perform a sanity check to ensure that the "isValid" flag is also true before commencing to validate the identifier 345.

FIG. 6C shows the data structure 600 after the validator 350 has found that the identifier 345 is not associated with a valid account at an institution. In this example, the validator 350 uses an external validation API, and populates the corresponding data structure 600 field ("Giact Verification") with the result of that API call. The authorization status 355 may be the value of this field, in some embodiments.

Figure 7:
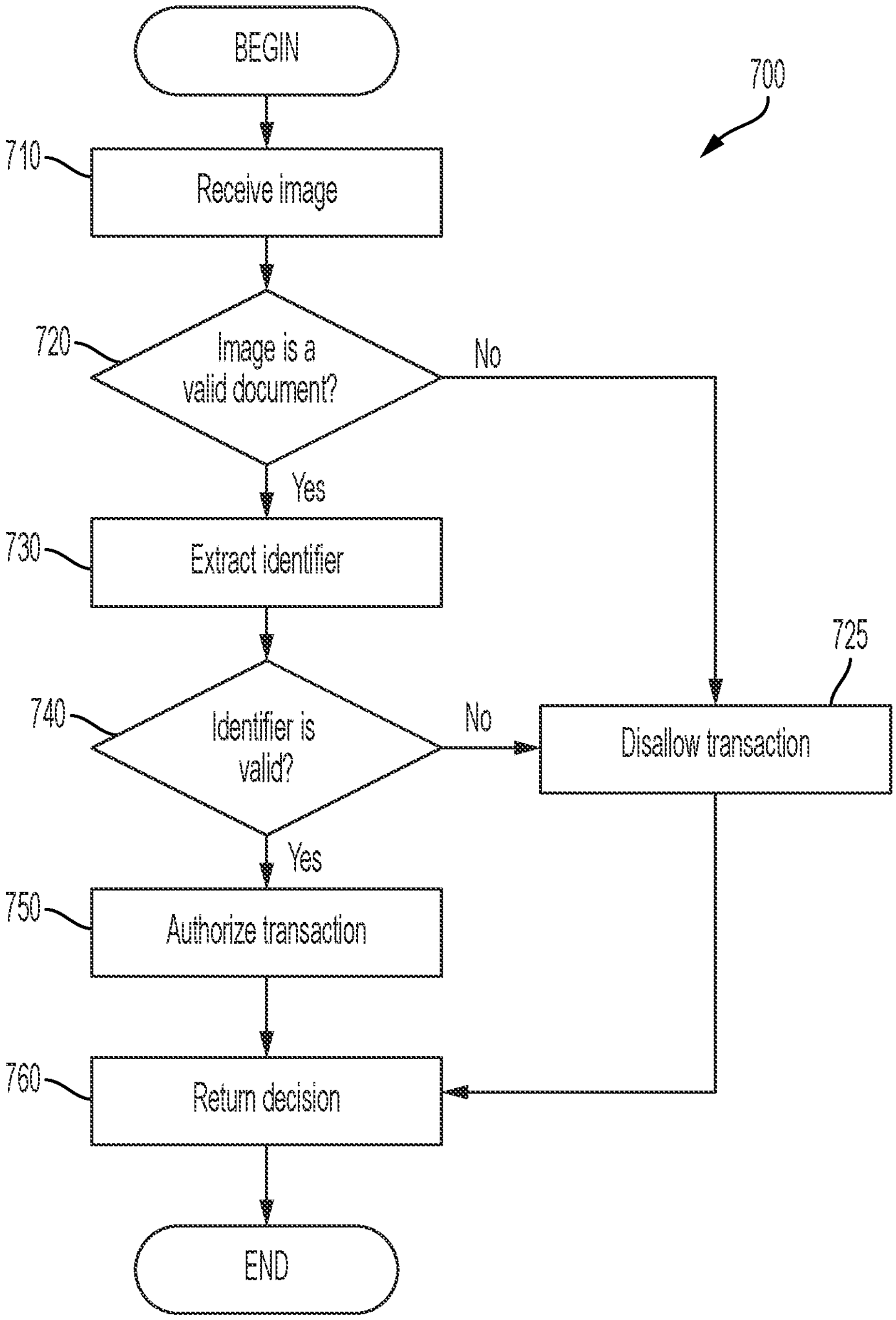
FIG. 7 shows a process performed in some embodiments by the system in FIG. 3.

FIG. 7 shows a process 700 performed in some embodiments by the system 300 in FIG. 3. At 710 the process 700 receives an image 315, e.g. from the image storage 310. The process 700 may receive the image 315 from an authorization API in some embodiments. For example, a user may initiate a call to the authorization API in order to request authorization for a transaction, and provide the image 315 as part of the call (e.g., via file upload, local device camera, etc.). For example, FIG. 4 illustrates an example of an image of a voided check that was received as an uploaded scan. FIG. 5 illustrates an example of an image of a voided check that was received by holding the check up to a webcam.

At 720, the process 700 determines whether the image 315 is a valid document. In some embodiments, the process 700 makes this determination using a classifier 320, which is described in more detail with reference to process 800 in FIG. 8. In some embodiments, a list of valid document types for the requested transaction is stored in a data storage, e.g., a database or a cache. Such a data storage may be separate from the image storage 310 or may include the image storage 310. The determination made by the process 700 at 720 in that case also includes retrieving the valid document types for the requested transaction from the data storage, and analyzing the provided image 315 to determine if it matches one of the required document types for the requested transaction.

If the process 700 determines that the image 315 is not a valid document, then the process 700 proceeds to 725, and denies the requested transaction. In some embodiments, a validator 350 performs the denial operation, based on receiving the determination that the image 315 does not represent a valid document. The process 700 proceeds to 760, which is described below.

If the process 700 determines that the image 315 is a valid document, then the process 700 proceeds to 730, and extracts an identifier 345 from the image 315. In some embodiments, the process 700 extracts the identifier 345 by first performing a segmentation operation to identify a portion 335 that contains the identifier 345, and performing a character recognition operation to extract the identifier 345 as text from the identified portion 335. Some embodiments perform the segmentation operation and/or the character recognition operation with a segmenter 330, which is described in more detail with reference to process 1100 in FIG. 11.

In some embodiments, the portion of the electronic image that is expected to store the identifier is also stored in the data storage, for each document type. In that case, the process 700 also retrieves the expected portion from the data storage based on the document type and uses that expected portion to extract the identifier at 730.

At 740, the process 700 determines whether the identifier 345 is valid. In some embodiments, the process 700 validates the identifier 345 by making a call to a validation API, provided by a commercial or government entity. Examples of such validation APIs include but are not limited to financial validation APIs to validate bank account routing numbers and account numbers, and identification validation APIs to validate personal identification documents such as passports and drivers' licenses. In some embodiments, a validator 350 performs the validation operation.

If the process 700 determines that the identifier 345 is valid, then the process 700 proceeds to 750, and authorizes the requested transaction. If the process 700 determines that the identifier 345 is invalid, then the process 700 proceeds to 725, and denies the requested transaction. In some embodiments, a validator 350 performs the authorization or denial operation. The process 700 proceeds to 760, which is described below.

At 760, the process 700 provides the authorization decision (e.g., authorization or denial of the requested transaction) that was made based on the validity of the image 315 or the identifier 345. In some embodiments, the decision is provided as a response to the call to the authorization API. The decision may be provided by a returner 360 in some embodiments. The process 700 then ends.

As discussed, several operations performed by the process 700 involve calls and/or responses to different APIs (e.g., an authorization API, a validation API, etc.). In some embodiments, these calls to APIs are performed by one or more API handlers. A single API handler may handle a single API, or may handle multiple APIs. Moreover, an API handler may be a standalone component of the system 300 or may be a sub-component of another component, such as the extractor 340, the validator 350, and/or the returner 360.

Figure 8:
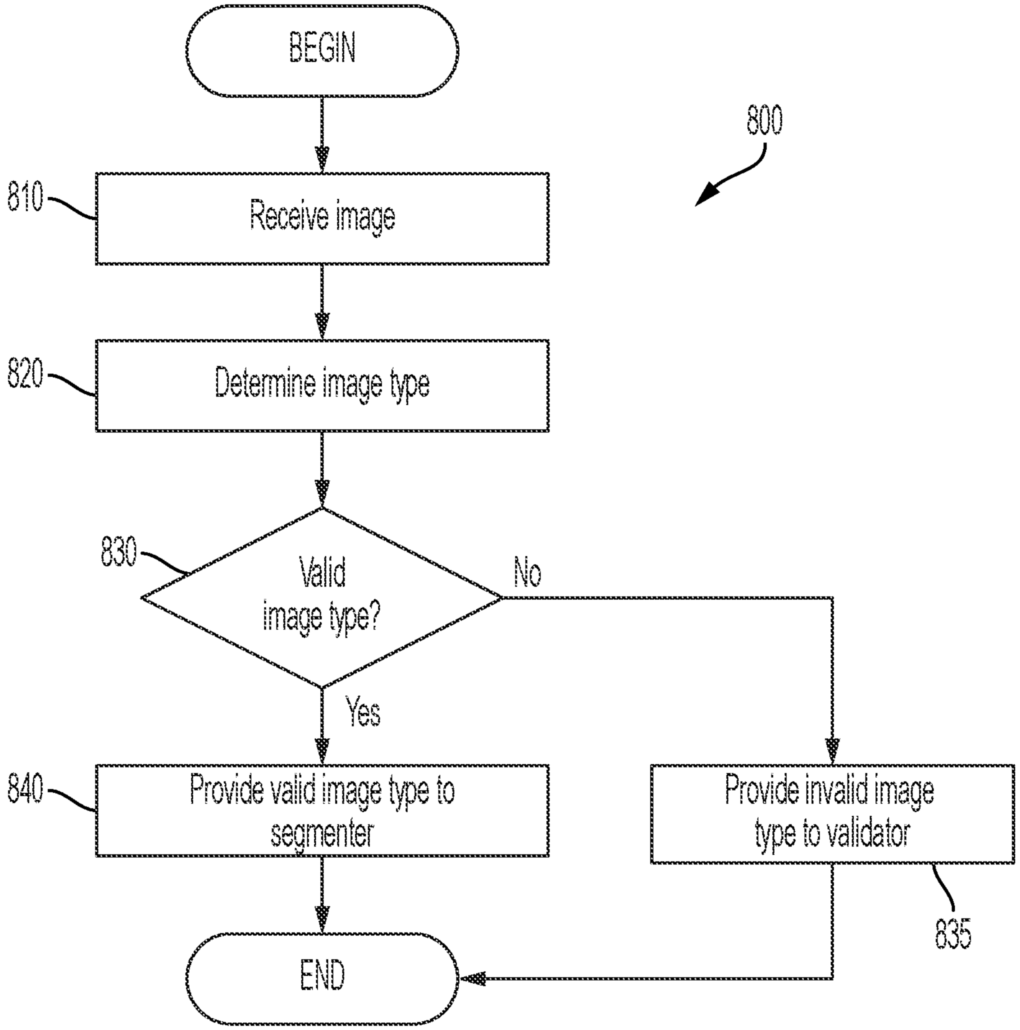
FIG. 8 shows a process performed in some embodiments by the classifier of the system in FIG. 3.

FIG. 8 shows a process 800 performed in some embodiments by the classifier 320 of the system 300 in FIG. 3. At 810, the process 800 receives the image 315. In some embodiments, the image 315 is received from an image storage 310 of the system 300. In other embodiments, the process 700 may receive the image 315 directly from an authorization API.

At 820, the process 800 determines the type of the document represented by the image 315. The process 800 determines the type in some embodiments by using a neural network 200. The type may be one of multiple different possible types, including at least one valid type 325 and at least one invalid type 327.

At 830, if the determined type is a valid type 325, then the process 800 provides the valid type 325 to the segmenter 330. In some embodiments, the process 800 also provides the image 315 to the segmenter 330. If the determined type is an invalid type 327, then the process 800 provides the invalid type 327 to the validator 350. Alternatively, the process 800 provides the determined type to the validator 350, for the validator 350 to assess if valid or invalid, and provide to the segmenter 330 if it is a valid type 325. The process 800 then ends.

Figure 9:
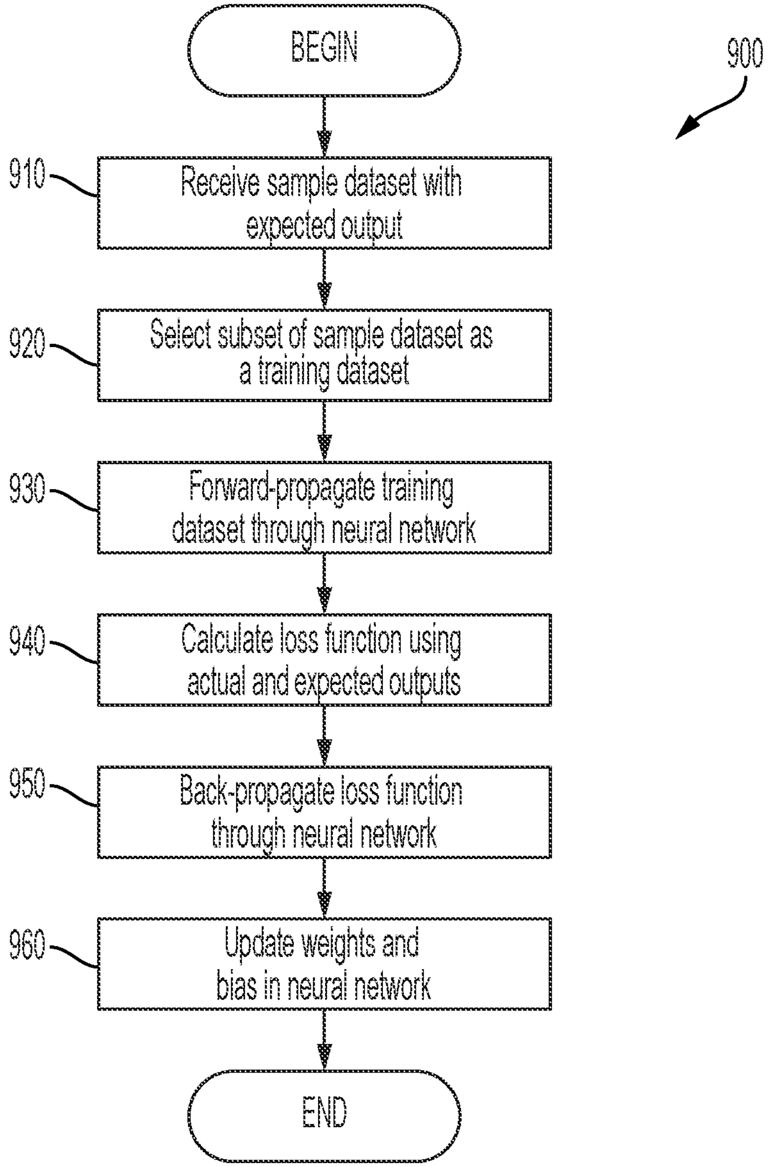
FIG. 9 shows a training process performed in some embodiments by the trainer of the system in FIG. 3.

FIG. 9 shows a training process 900 performed in some embodiments by the trainer 305 of the system 300 in FIG. 3. The process 900 may be used to train either the classifier 320 or the segmenter 330. At 910, the process 900 receives a sample dataset 337. In some embodiments where the process 900 trains the classifier 320, the sample dataset 337 includes sample images with known types. In other words, each image has a predetermined type that is the expected output of the neural network 200 when used as an input. In some embodiments where the process 900 trains the segmenter 330, the sample dataset 337 includes annotated images of each document type to indicate the areas containing the identifiers.

At 920, the process 900 selects a subset of the sample dataset 337 as a training dataset. The selection is a randomized selection in some embodiments. By using only a subset of the sample dataset 337 for training, the process 900 ensures that the training process is robust enough for the neural network 200 to correctly process input images that were not seen during training (and, eventually, when performing an inference operation on unknown data with no known type or identifier area).

At 930, the process 900 uses the selected training dataset as an input to the neural network 200, for either the classifier 320 or the segmenter 330. The training dataset is forward-propagated through the neural network 200 to generate an output, i.e., an identified type for each input image in the training dataset.

At 940, the process 900 calculates a loss function using the output of the neural network 200. The loss function is calculated as a function of the actual outputs and the expected outputs. In some embodiments where the neural network 200 is a multiple-classification network (e.g., a convolutional neural network that classifies input into one of multiple possible output types), the loss function may be a categorical cross-entropy loss function. See Murphy, Kevin P., Machine learning: a probabilistic perspective, Cambridge, The MIT Press, 2012, incorporated herein by reference in its entirety.

At 950, the process 900 back-propagates the loss function through the neural network 200. Starting from the output layer of the neural network 200, the process 900 calculates a gradient of the loss function at each layer using the values of the weights and bias parameter values of that layer, and adjusts those values to minimize that gradient.

At 960, the process 900 updates the values of the weights and bias parameters in the neural network 200, using the adjusted values that minimize the gradient of the loss function at each layer. The process 900 then ends.

Figure 10:
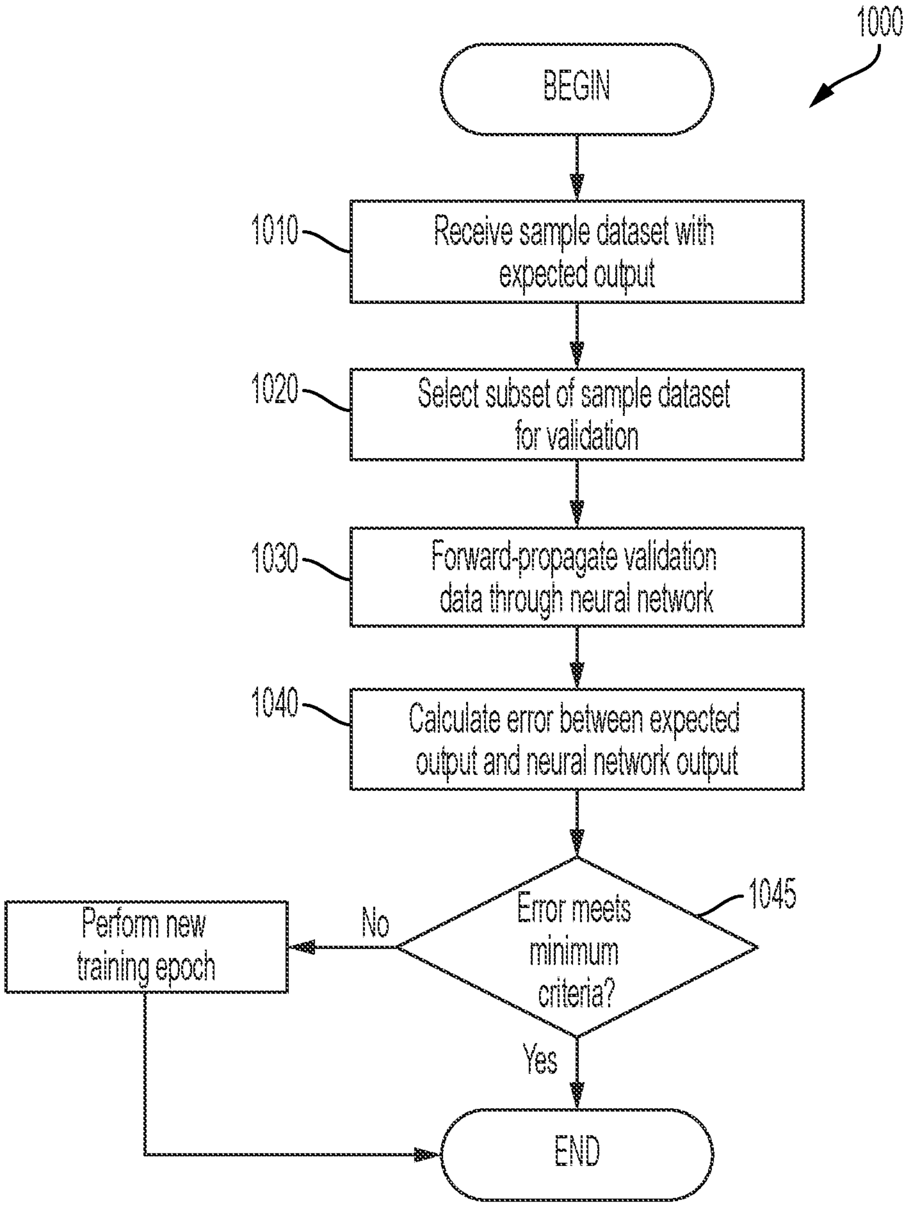
FIG. 10 shows a validation process performed in some embodiments by the trainer of the system in FIG. 3.

FIG. 10 shows a validation process 1000 performed in some embodiments by the trainer 305 of the system 300 in FIG. 3. At 1010, the process 1000 receives a sample dataset 337 of sample images with known types. In other words, each image has a predetermined type that is the expected output of the neural network 200 when used as an input.

At 1020, the process 1000 selects a subset of the sample dataset 337 as a validation dataset. The selection is a randomized selection in some embodiments. By using only a subset of the sample dataset 337 for validation, the process 1000 ensures that the training process is adequately tested, by using input images for the neural network 200 that were not seen during training.

At 1030, the process 1000 uses the selected training dataset as an input to the neural network 200, for either the classifier 320 or the segmenter 330. The validation dataset is forward-propagated through the neural network 200 to generate an output, i.e., an identified type or an identified area (bounding box) for each input image in the validation dataset.

At 1040, the process 1000 calculates the error between the actual output of the neural network 200 and the expected output. The process 1000 then determines at 1045 if that error meets a minimum criterion for validation.

For example, while training the classifier 320, if the neural network 200 has multiple output nodes corresponding to each possible classification, then each node will have a probability that ideally should be zero if the input is not of that node's class, and 1 if the input is of that node's class. However, in practice, the values of the nodes will be values close to 0 or 1 but not exactly these values. The criterion for validation would be a minimum value (e.g., at least 50.1%, or preferably 75%, or more preferably 90%) to indicate that that the input belongs to a class and a maximum value to indicate that the input does not belong to a class (e.g., at most 49.9%, or preferably at most 25%, or more preferably at most 10%).

If the process 1000 determines at 1045 that the error does not meet the minimum criterion, then the process 1000 proceeds to 1050, at which the process 1000 performs a new training epoch. For example, the process 1000 may perform process 900.

If the process 1000 determines at 1045 that the error does meet the minimum criterion, then the process 1000 ends.

Figure 11:
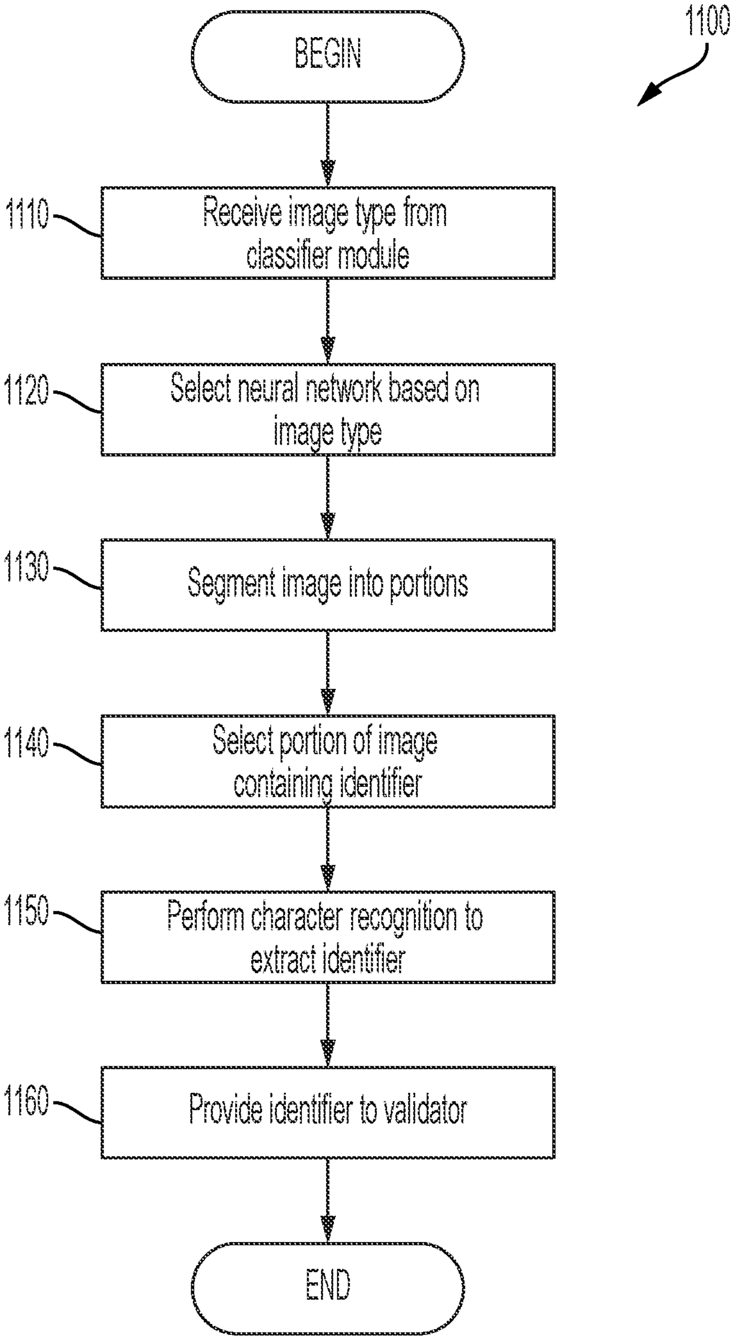
FIG. 11 shows a process performed in some embodiments by the segmenter of the system in FIG. 3.

FIG. 11 shows a process 1100 performed in some embodiments by the segmenter 330 of the system 300 in FIG. 3. At 1110, the process 1100 receives the valid type 325 and the image 315. In some embodiments, the process 1100 receives the valid type 325 from the classifier 320 or the validator 350, and receives the image 315 from the image storage 310. In other embodiments, the process 1100 also receives the image 315 from the classifier 320 or the validator 350.

At 1120, the process 1100 selects a neural network 200 based on the valid type 325. Different neural networks have different characteristics, which are optimal for different types of input, including images, video, and documentation. Moreover, it may be more computationally efficient in some embodiments to train different neural networks to perform segmentation of different valid input types. As an example, if the image is a financial document, then the accuracy of extracting financial identifiers may be improved by a dedicated neural network for bank statements and another dedicated neural network for voided checks. For bank statements, the financial identifier(s) would be in a different portion of the document (e.g., at the top of the document) than for voided checks (e.g., at the bottom, and delimited by different symbols).

In some embodiments the selected neural network 200 also has different outputs based on the identified valid type 325, such as a routing number in the case of a voided check which would not exist on a bank statement. Likewise, a passport would have a passport number in a different alphanumeric format than a driver's license.

Though multiple neural networks may be available based on the valid type 325, it is not required. In some embodiments, a single neural network 200 is used to segment two, or more, or all of the available valid types that are classes of the classifier 320.

At 1130, the process 1100 uses the selected neural network 200 to segment the image 315 into portions. These portions may contain identifiers, like user identifiers or financial identifiers, which the neural network 200 was trained to identify and which may be specific to the type.

At 1140, the process 1100 selects a portion 335 that contains an identifier. The portion may be defined relative to the image 315 by bounding box coordinates that are the output of the neural network 200, or may be cropped to exclude other portions of the image that do not contain the identifier. In some embodiments there may be multiple portions 335 corresponding to multiple identifiers (e.g., in FIG. 5, the user identifier in the upper left and the financial identifier at the bottom).

At 1150, the process 1100 performs a character recognition operation on the portion 335 to extract the identifier 345. The character recognition operation may be a call to an API in some embodiments, using the portion 335 as the input to the call. The process 1100 provides at 1160 the extracted identifier 345 to the validator 350, and the process 1100 then ends.

Figure 12:
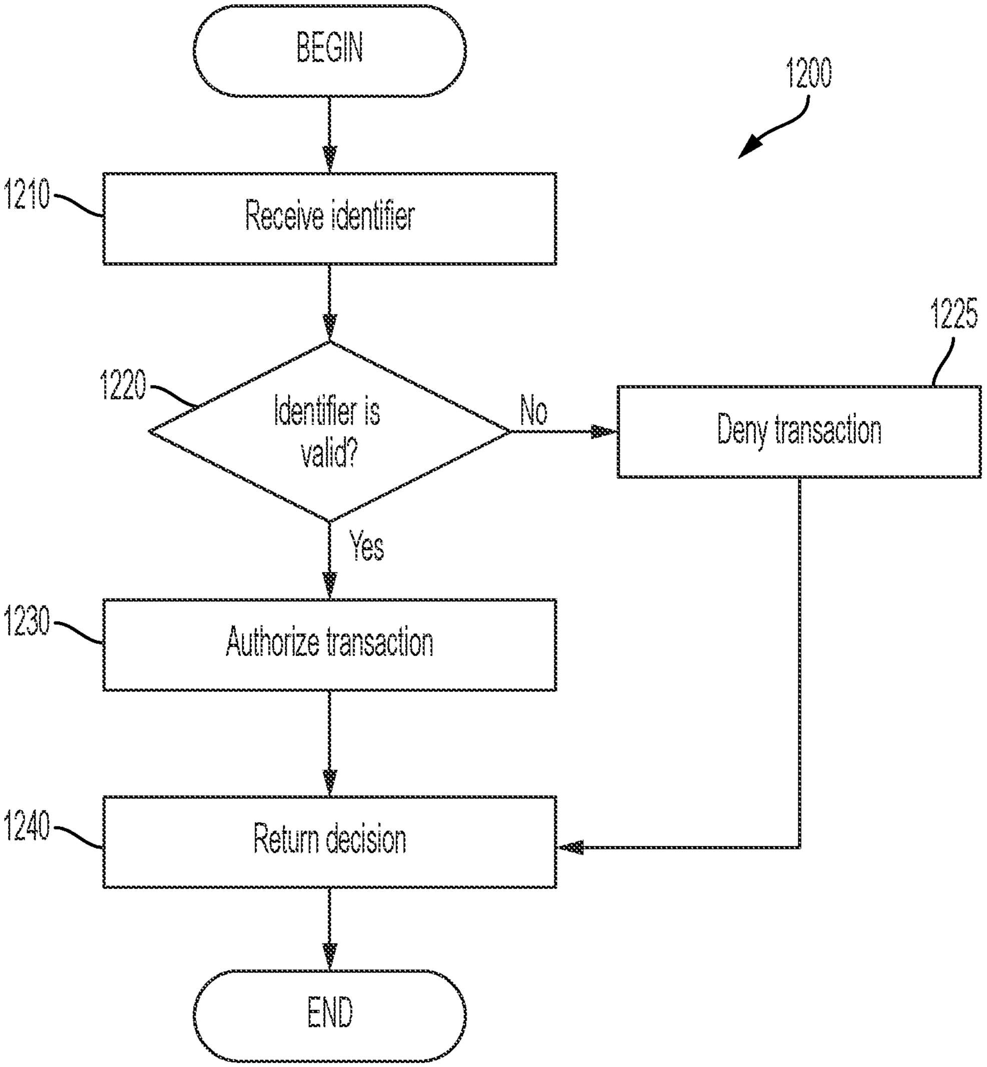
FIG. 12 shows a process performed in some embodiments by the validator of the system in FIG. 3.

FIG. 12 shows a process 1200 performed in some embodiments by the validator 350 of the system 300 in FIG. 3. At 1210, the process 1200 receives the extracted identifier 345 from the segmenter 330.

At 1220, the process 1200 determines if the identifier 345 is valid. In some embodiments, the process 1200 makes the determination by using a call to a validation API, with the identifier 345 as an input. If the process 1200 determines that the identifier 345 is invalid, then the process continues to 1225, and denies the transaction. If the process 1200 determines that the identifier 345 is valid, then the process 1200 authorizes the transaction.

Regardless of whether the process 1200 has denied or authorized the transaction, the process 1200 continues to 1240, and returns the authorization decision (i.e., deny or allow). In some embodiments, the process 1200 returns the authorization decision to a returner 360, which then provides the decision to the requesting entity (e.g., as a response to a call to an authorization API). The process 1200 then ends.

The integrated circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IoT) devices, etc.

Figure 13:
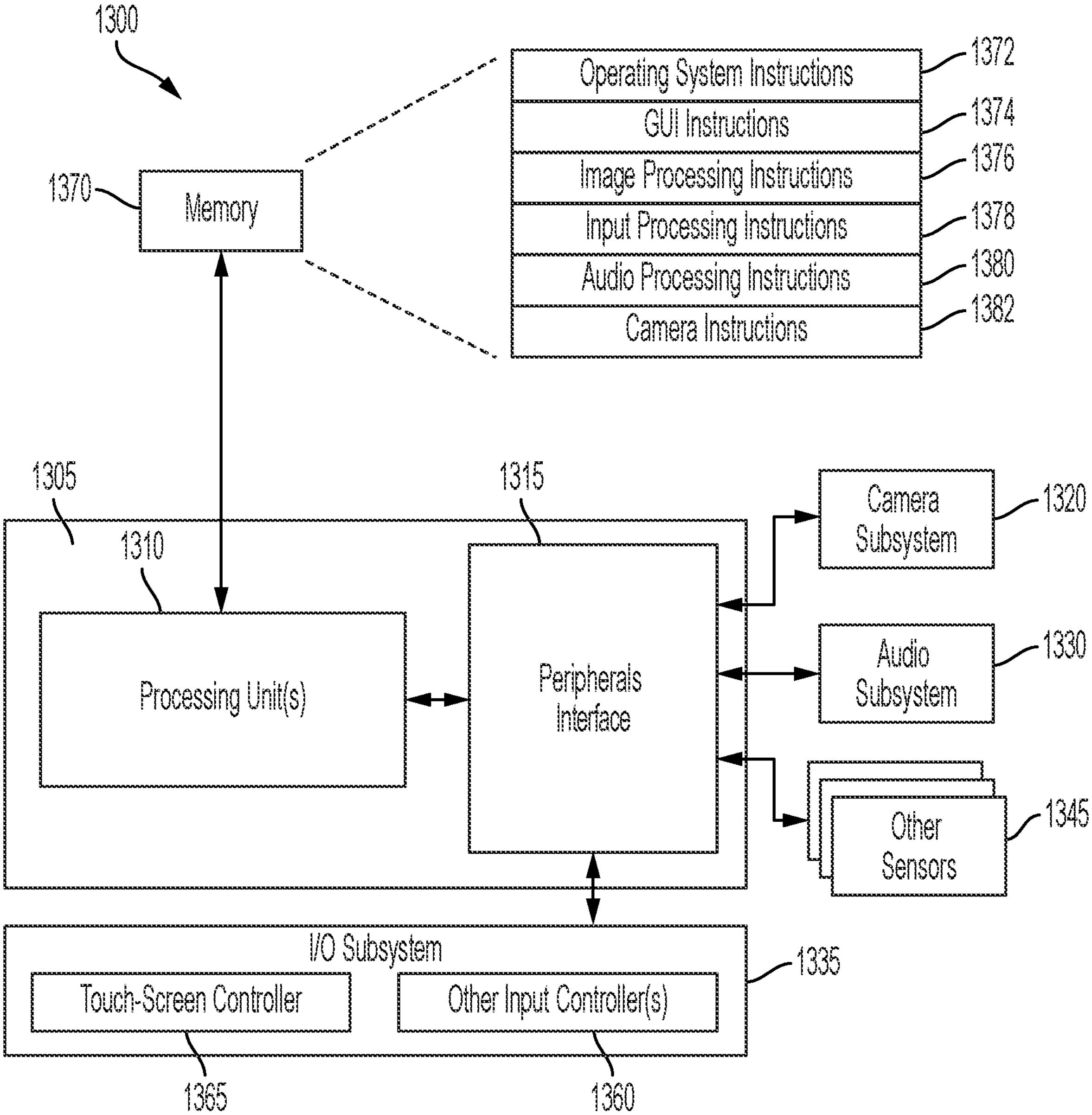
FIG. 13 conceptually illustrates an example of an architecture of an electronic device that includes one or more components of the system in FIG. 3.

FIG. 13 is an example of an architecture of an electronic device 1300 of some embodiments, such as a smartphone, tablet, laptop, etc., or another type of device (e.g., an IoT device, a personal home assistant). As shown, the device 1300 includes an integrated circuit 1305 with one or more general-purpose processing units 1310 and a peripherals interface 1315.

The peripherals interface 1315 is coupled to various sensors and subsystems, including a camera subsystem 1320, an audio subsystem 1330, an I/O subsystem 1335, and other sensors 1345 (e.g., motion/acceleration sensors), etc. The peripherals interface 1315 enables communication between the processing units 1310 and various peripherals. For example, an orientation sensor (e.g., a gyroscope) and an acceleration sensor (e.g., an accelerometer) can be coupled to the peripherals interface 1315 to facilitate orientation and acceleration functions. The camera subsystem 1320 is coupled to one or more optical sensors (e.g., charged coupled device (CCD) optical sensors, complementary metal-oxide-semiconductor (CMOS) optical sensors, etc.). The camera subsystem 1320 and the optical sensors facilitate camera functions, such as image and/or video data capturing.

The audio subsystem 1330 couples with a speaker to output audio (e.g., to output voice navigation instructions). Additionally, the audio subsystem 1330 is coupled to a microphone to facilitate voice-enabled functions, such as voice recognition, digital recording, etc. The I/O subsystem 1335 involves the transfer between input/output peripheral devices, such as a display, a touch screen, etc., and the data bus of the processing units 1310 through the peripherals interface 1315. The I/O subsystem 1335 various input controllers 1360 to facilitate the transfer between input/output peripheral devices and the data bus of the processing units 1310. These input controllers 1360 couple to various input/control devices, such as one or more buttons, a touch-screen, etc. The input/control devices couple to various dedicated or general controllers, such as a touch-screen controller 1365.

In some embodiments, the device includes a wireless communication subsystem (not shown in FIG. 13) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 13, a memory 1370 (or set of various physical storages) stores an operating system 1372. The operating system 1372 includes instructions for handling basic system services and for performing hardware dependent tasks. The memory 1370 also stores various sets of instructions, including (1) graphical user interface instructions 1374 to facilitate graphic user interface processing; (2) image processing instructions 1376 to facilitate image-related processing and functions; (3) input processing instructions 1378 to facilitate input-related (e.g., touch input) processes and functions; (4) audio processing instructions 1380 to facilitate audio-related processes and functions; and (5) camera instructions 1382 to facilitate camera-related processes and functions. The processing units 1310 execute the instructions stored in the memory 1370 in some embodiments.

The memory 1370 may represent multiple different storages available on the device 1300. In some embodiments, the memory 1370 includes volatile memory (e.g., high-speed random access memory), non-volatile memory (e.g., flash memory), a combination of volatile and non-volatile memory, and/or any other type of memory.

The instructions described above are merely examples and the memory 1370 includes additional and/or other instructions in some embodiments. For instance, the memory for a smartphone may include phone instructions to facilitate phone-related processes and functions. An IoT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits. For example, a neural network parameter memory stores the weight values, bias parameters, etc. for implementing one or more machine-trained networks by the integrated circuit 1305. Different clusters of cores can implement different machine-trained networks in parallel in some embodiments. In different embodiments, these neural network parameters are stored on-chip (i.e., in memory that is part of the integrated circuit 1305) or loaded onto the integrated circuit 1305 from the memory 1370 via the processing unit(s) 1310.

While the components illustrated in FIG. 13 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 13 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
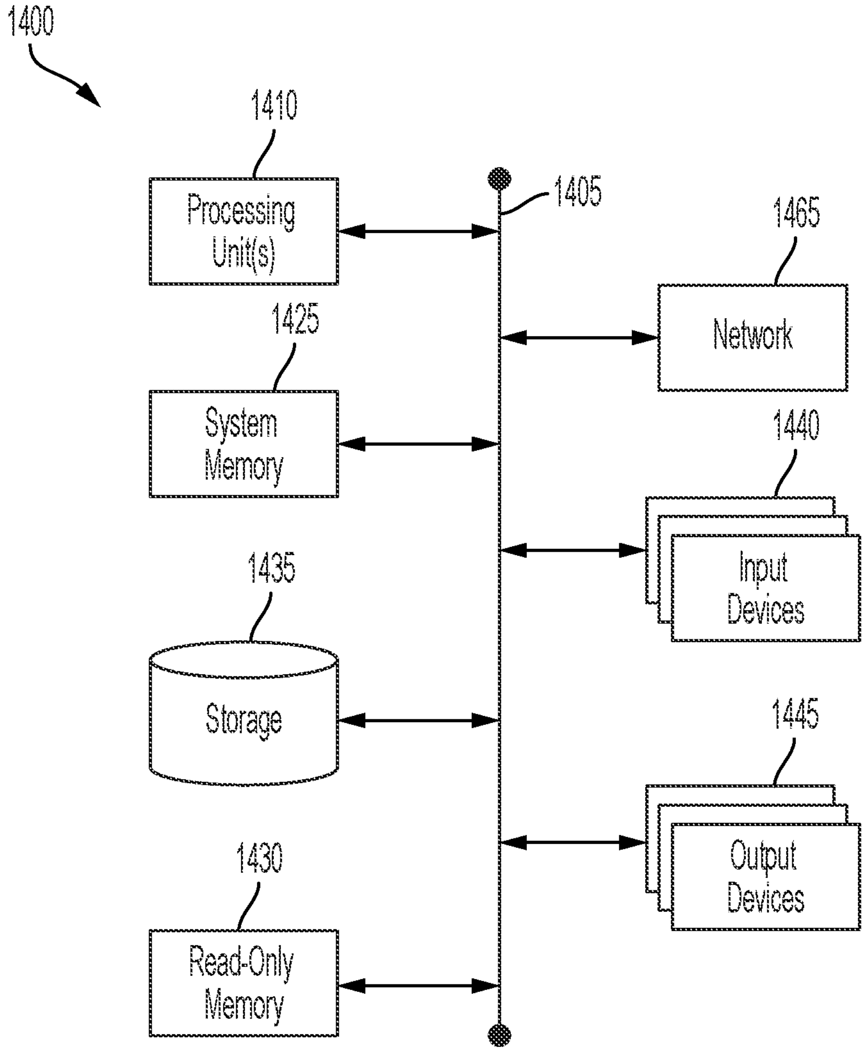
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the control and/or compiler systems described above in some embodiments. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1425, and the permanent storage device 1435.

From these various memory units, the processing unit(s) 1410 retrieves instructions to execute and data to process in order to execute the processes of the invention. The processing unit(s) may be a single processor or a multi-core processor in different embodiments.

The read-only-memory 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random-access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieves instructions to execute and data to process in order to execute the processes of some embodiments.

The bus 1405 also connects to the input devices 1440 and output devices 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The invention claimed is:

1. A system, comprising:

a data processing system comprising one or more processors, coupled with memory, to:

receive a request to authorize an electronic transaction based on an electronic image;

train one or more neural networks according to a cyclic optimization technique;

classify, using the one or more trained neural networks, responsive to the request, the electronic image as a first type of document;

identify, using the one or more trained neural networks, responsive to the classification of the electronic image as the first type of document, a portion of the electronic image that contains an identifier;

extract, using a character recognition technique, responsive to the identification of the portion, the identifier from the portion of the electronic image;

determine, using an application programming interface configured to communicate with a server of an institution, a validation status of an account maintained by the institution that corresponds to the identifier extracted from the portion of the electronic image, the validation status indicating that the identifier is associated with the account at the institution; and perform an action to authorize the electronic transaction based on the validation status.

2. The system of claim 1, the data processing system to:

classify the electronic image as the first type of document using a first neural network of the one or more neural networks; and identify the portion of the electronic image that contains the identifier using a second neural network of the one or more neural networks, wherein the second neural network is different from the first neural network.

3. The system of claim 2, the data processing system to:

select the second neural network based on the classification of the electronic image as the first type of document.

4. The system of claim 1, wherein to classify the electronic image as the first type of document, the data processing system is further configured to:

generate, via the one or more neural networks, an output that indicates the classification of the electronic image as a valid type of document.

5. The system of claim 1, the data processing system to:

determine the validation status is valid; and perform the action to authorize the electronic transaction.

6. The system of claim 1, the data processing system to:

determine the validation status is invalid; and perform the action to deny the electronic transaction.

7. The system of claim 1, the data processing system to:

receive a request to authorize a second transaction based on a second electronic image;

classify, via the one or more neural networks, the second electronic image as a second type of document, wherein the second type indicates that the second electronic image is not a valid document; and deny, responsive to the classification of the electronic image as the second type of document, the second transaction.

8. The system of claim 1, the data processing system to:

transmit, via an authorization application programming interface, an indication to perform the action based on the validation status.

9. The system of claim 1, the data processing system to:

classify the electronic image as the first type of document corresponding to a valid document, wherein:

the valid document corresponds to at least one of a bank statement or a check, and the identifier comprises at least one of a financial identifier or a user identifier.

10. The system of claim 1, the data processing system to:

classify the electronic image as the first type of document corresponding to a valid document, wherein:

the valid document corresponds to at least one of a passport or a birth certificate, and the identifier comprises at least one of a legal name, a place of birth, or a passport number.

11. The system of claim 10, wherein the electronic transaction corresponds to a visa application.

12. A method, comprising:

receiving, by a data processing system comprising one or more processors, coupled with memory, a request to authorize an electronic transaction based on an electronic image;

training, by the data processing system, one or more neural networks according to a cyclic optimization technique;

classifying, by the data processing system, using the one or more trained neural networks, responsive to the request, the electronic image as a first type of document;

identifying, by the data processing system, using the one or more trained neural networks, responsive to the classification of the electronic image as the first type of document, a portion of the electronic image that contains an identifier;

extracting, by the data processing system, using a character recognition technique, responsive to the identification of the portion, the identifier from the portion of the electronic image;

determining, by the data processing system, using an application programming interface configured to communicate with a server of an institution, a validation status of an account maintained by the institution that corresponds to the identifier extracted from the portion of the electronic image, the validation status indicating that the identifier is associated with the account at the institution; and performing, by the data processing system, an action to authorize the electronic transaction based on the validation status.

13. The method of claim 12, comprising:

classifying, by the data processing system, the electronic image as the first type of document using a first neural network of the one or more neural networks; and identifying, by the data processing system, the portion of the electronic image that contains the identifier using a second neural network of the one or more neural networks, wherein the second neural network is different from the first neural network.

14. The method of claim 13, comprising:

selecting, by the data processing system, the second neural network based on the classification of the electronic image as the first type of document.

15. The method of claim 13, wherein classifying the electronic image as the first type of document further comprises:

generating, by the data processing system, via the one or more neural networks, an output that indicates the classification of the electronic image as a valid type of document.

16. The method of claim 12, comprising:

determining, by the data processing system, the validation status is valid; and performing, by the data processing system, the action to authorize the electronic transaction.

17. The method of claim 12, comprising:

determining, by the data processing system, the validation status is invalid; and performing, by the data processing system, the action to deny the electronic transaction.

18. A non-transitory computer-readable medium storing processor-executable instructions that, when executed by one or more processors, cause the one or more processors to:

receive a request to authorize an electronic transaction based on an electronic image;

train one or more neural networks according to a cyclic optimization technique;

classify, using the one or more trained neural networks, responsive to the request, the electronic image as a first type of document;

identify, using the one or more trained neural networks, responsive to the classification of the electronic image as the first type of document, a portion of the electronic image that contains an identifier;

extract, using a character recognition technique, responsive to the identification of the portion, the identifier from the portion of the electronic image;

determine, using an application programming interface configured to communicate with a server of an institution, a validation status of an account maintained by the institution that corresponds to the identifier extracted from the portion of the electronic image, the validation status indicating that the identifier is associated with the account at the institution; and perform an action to authorize the electronic transaction based on the validation status.

19. The non-transitory computer-readable medium of claim 18, wherein the instructions further comprise instructions to:

classify the electronic image as the first type of document using a first neural network of the one or more neural networks; and identify the portion of the electronic image that contains the identifier using a second neural network of the one or more neural networks, wherein the second neural network is different from the first neural network.

20. The system of claim 1, wherein the cyclic optimization technique is stochastic gradient descent.

* * * * *